Patented June 22, 1954

2,681,913

UNITED STATES PATENT OFFICE 2,681,913

ESTERS OF N,N-DISUBSTITUTED AMINO ACIDS AND HYDROGENATED 4,7-METHANOINDEN-6-OLS AND THEIR SALTS

John W. Cusic, Skokie, Ill., assignor to G. D. Searle & Co., Chicago, Ill., a corporation of Illinois No Drawing. Application November 24, 1951, Serial No. 258,089

15 Claims. (Cl. 260—294.3)

The present invention relates to a new group of esters of polycarbocyclic alcohols and, particularly, to the esters of N,N-disubstituted amino acids and hydrogenated 4,7-methanoinden-6-ols and their salts.

The esters which constitute this invention can be represented as compounds of the following general structural formula

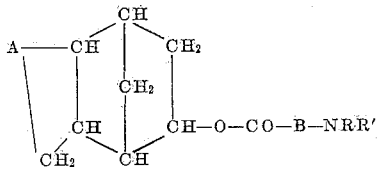

and salts thereof, wherein A is either a vinylene group or an ethylene group, B is a lower, bivalent, saturated, aliphatic hydrocarbon radical, and the radical NRR' is either a lower dialkylamino radical or a nitrogen containing heterocyclic radical attached through a nitrogen in the heterocycle to the radical A.

In the foregoing structural formula, the radical B is derived from such straight-chained or branch-chained hydrocarbon radicals as methylene, ethylene, propylene, butylene, amylene, hexylene or polymethylene radicals such as trimethylene, tetramethylene, pentamethylene, and hexamethylene.

The radicals R and R' can be lower alkyl groups such as methyl, ethyl and straight and branch-chained propyl, butyl, amyl and hexyl. The radical NRR' can also be nitrogen-containing lower heterocyclic radical such as a piperazino, N'-alkylpiperazino, and thiamorpholino radical, but of particular interest are the heterocyclic radicals of the type

wherein B is either an ethyleneoxyethylene radical, as in the case of the morpholino radical, or an alkylene chain containing 4 to 7 carbon atoms, 4 or 5 of which are in nuclear position, as in the case of pyrrolidino, piperidino, 2,5-dimethylpyrrolidino, and 2,6-lupetidino radicals.

The organic bases described herein form salts with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The esters which constitute the present invention are valuable as intermediates in organic synthesis. They are of value as medicinal agents because of their effect on the circulatory system. The quaternary salts are potent inhibitors of autonomic nervous functions. Other salts are active parasiticides.

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom. In each of these examples quantities of materials are expressed as parts by weight, temperatures as degrees centigrade (° C.), and pressures during vacuum distillation as millimeters (mm.) of mercury.

EXAMPLE 1

3a,4,5,6,7,7a - hexahydro - 4,7 - methanoinden-6-ol β-diethylaminopropionate

A mixture of 750 parts of 3a,4,5,6,7,7a-hexahydro-4,7-methanoinden-6-ol and 500 parts of pyridine in anhydrous ether is stirred with ice cooling and treated by dropwise addition with 635 parts of β-chloropropionyl chloride. After standing for several hours at room temperature, the reaction mixture is treated with ice and dilute hydrochloric acid, washed well with water, and the organic layer dried over anhydrous calcium chloride. On removal of the solvents by vacuum distillation the oily 3a,4,5,6,7,7a-hexahydro-4,7-methanoinden-6-ol β-chloropropionate is obtained.

600 parts of this ester are heated with 300 parts of diethylamine, 800 parts of butanone and 20 parts of potassium iodide at 80° C. for 12 hours in a shielded pressure reactor. A heavy precipitate forms. After concentration on the steam bath, the residue is treated with dilute hydrochloric acid and the aqueous layer is separated, washed with ether, rendered alkaline by addition of sodium hydroxide and extracted with ether.

The ether extract is dried over anhydrous potassium carbonate, filtered and evaporated to yield as a residue the 3a,4,5,6,7,7a-hexahydro-4,7 - methanoinden - 6 - ol β - diethylaminopropionate which boils at about 137–140° C. and 2 mm. pressure.

An ether solution of this base is treated with one equivalent of a 25% solution of hydrogen chloride in anhydrous isopropanol. The initially oily hydrochloride solidifies within a short time and the crystals thus obtained melt at about 126–127° C. This salt has the structural formula

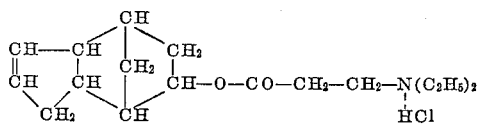

EXAMPLE 2

3a,4,5,6,7,7a - hexahydro - 4,7 - methanoinden-6-ol β-diethylaminopropionate methobromide A solution of 150 parts of 3a,4,5,6,7,7a-hexahydro-4,7-methanoinden-6-ol β-diethylaminopropionate and 173 parts of methylbromide in 400 parts of butanone is maintained at room temperature in a shielded pressure reactor for 15 hours. Upon chilling and treatment with ether, a solid precipitate forms. The hygroscopic 3a,4,5,6,7,7a - hexahydro - 4,7 - methanoinden-6 - ol β - diethylaminopropionate methobromide melts at about 116–119° C. It has the structural formula

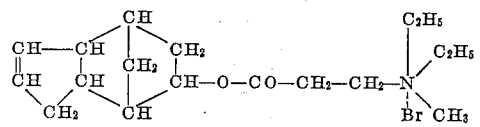

EXAMPLE 3

3a,4,5,6,7,7a - hexahydro - 4,7 - methanoinden-6-ol γ-diisopropylaminobutyrate

A mixture of 300 parts of 3a,4,5,6,7,7a-hexahydro-4,7-methanoinden-6-ol and 200 parts of pyridine in 1500 parts of anhydrous ether is treated by the dropwise addition of 282 parts of γ-chlorobutyryl chloride with ice chilling and agitation. After standing the reaction mixture is treated with ice and dilute hydrochloric acid, washed well with water, and the organic layer is dried over anhydrous calcium sulfate. Upon removal of the solvents under vacuum, the 3a,4,5,6,7,7a-hexahydro - 4,7 - methanoinden - 6 - ol γ-chlorobutyrate is obtained as an oil.

255 parts of this oil are heated with 150 parts of diisopropylamine in 500 parts of benzene for 10 hours in a pressure vessel. After concentration on the steam bath the residue is extracted with dilute hydrochloric acid and the extract is washed with ether and rendered alkaline by the addition of sodium hydroxide and extracted with ether. This ether extract is dried over anhydrous calcium sulfate, filtered and evaporated to yield the 3a,4,5,6,7,7a - hexahydro - 4,7 - methanoinden-6-ol γ-diisopropylaminobutyrate which is distilled at about 152–156° C. and about 1 mm. pressure. It has the structural formula

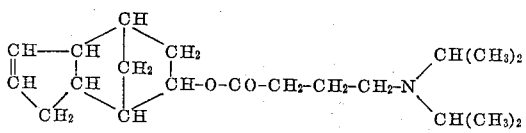

EXAMPLE 4

3a,4,5,6,7,7a - hexahydro - 4,7 - methanoinden-6-ol β-(N-2,5-dimethylpyrrolidino) propionate A mixture of 241 parts of 3a,4,5,6,7,7a-hexahydro - 4,7, - methanoinden - 6 - ol β - chloropropionate and 120 parts of 2,5-dimethylpyrrolidine in 1000 parts of toluene is refluxed for 3 hours. The resulting mixture is extracted with dilute hydrochloric acid and the extract is washed with ether, rendered alkaline by addition of sodium hydroxide and then extracted with ether. This ether extract is dried over anhydrous calcium sulfate, filtered and evaporated to yield the residual oily 3a,4,5,6,7,7a - hexahydro - 4,7 - methanoinden-6 - ol β - (2,5 - dimethylpyrrolidino) propionate which is distilled at about 162–166° C. and about 1 mm. pressure, and has the structural formula

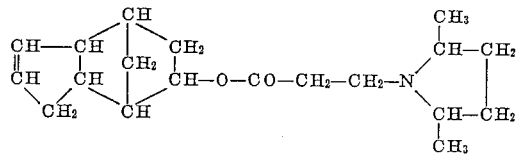

EXAMPLE 5

3a,4,5,6,7,7a - hexahydro - 4,7 - methanoinden-6-ol β-(N-piperidino) propionate

A mixture of 600 parts of 3a,4,5,6,7,7a-hexahydro - 4,7 - methanoinden - 6 - ol β-chloropropionate and 500 parts of piperidine in 1700 parts of toluene is heated at reflux temperature for 3 hours. The resulting mixture is extracted with dilute hydrochloric acid and the extract is rendered alkaline by addition of potassium hydroxide and extracted with ether. This ether extract is dried over anhydrous potassium carbonate, filtered, and evaporated. The residual oily 3a,4,5,6,7,7a - hexahydro - 4,7 - methanoinden-6-ol β-(N-piperidino) propionate boils at about 160–163° C. and 2 mm. pressure.

An ether solution of this base is treated with one equivalent of alcoholic hydrogen chloride. The resulting hydrochloride, recrystallized from isopropanol, melts at about 204–205° C.

EXAMPLE 6

3a,4,5,6,7,7a - hexahydro - 4,7 - methanoinden-6-ol β-(N-piperidino) propionate methobromide A solution of 150 parts of 3a,4,5,6,7,7a-hexahydro-4,7-methanoinden-6-ol β-(N-piperidino) propionate and 260 parts of methyl bromide in 400 parts of butanone is maintained in a shielded pressure reactor at room temperature. A heavy solid precipitate forms within 10 to 15 minutes. Recrystallized from a mixture of isopropanol and ether, the 3a,4,5,6,7,7a - hexahydro - 4,7 - methanoinden - 6 - ol β - (N - piperidino) propionate methobromide melts at about 165–166° C. It has the structural formula

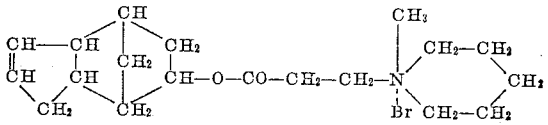

EXAMPLE 7

Hexahydro - 4,7 - methanoindan - 6 - ol β - diethylaminopropionate 300 parts of 3a,4,5,6,7,7a-hexahydro-4,7-methanoinden-6-ol are hydrogenated in the presence of 15 parts of Raney nickel and about 800 parts of ethanol at 600 lbs. pressure and 130–150° C.

for 75 minutes. After cooling the contents are filtered and the filtrate is distilled at about 127–129° C. and 19 mm. pressure. Upon chilling the hexahydro - 4,7 - methanoindan - 6 - ol crystallizes. Recrystallized from nitromethane it melts at about 45–53° C.

760 parts of hexahydro-4,7-methanoindan-6-ol and 500 parts of pyridine in 7000 parts of ether are chilled in an ice bath and stirred while being treated by dropwise addition of an ether solution of 635 parts of β-chloropropionyl chloride. A precipitate forms. After addition of dilute hydrochloric acid, the ether layer is separated, washed with water, dried over anhydrous calcium chloride, and distilled at about 165–175° C. and 12–15 mm. pressure.

500 parts of the hexahydro-4,7-methanoindan-6-ol β-chloropropionate and 250 parts of diethylamine in 900 parts of benzene are heated in a shielded pressure reactor at 80° C. for 12 hours. A precipitate forms. The reaction mixture is extracted with dilute hydrochloric acid and the extract is rendered alkaline and extracted with ether. This ether extract is dried over anhydrous potassium carbonate, filtered and evaporated. The remaining hexahydro-4,7-methanoindan-6-ol β-diethylaminopropionate is distilled at about 144–146° C. and 2 mm. pressure. Treatment of an ether solution of this base with one equivalent of an alcoholic solution of hydrogen chloride yields a crystalline hydrochloride, melting at about 154–155° C.

EXAMPLE 8

*Hexahydro - 4,7 - methanoindan - 6 - ol β - diethylaminopropionate methobromide*

A solution of 150 parts of 4,7-methanoindan-6-ol β-diethylaminopropionate and 260 parts of methyl bromide in 400 parts of butanone is maintained at room temperature in a shielded pressure vessel. A heavy solid precipitate forms within one or two hours. The resulting hexahydro-4,7-methanoindan-6-ol β-diethylaminopropinate methobromide melts at about 129–131° C. This bromide is converted to the dihydrogen citrate by treatment of an absolute isopropanol solution with 1 mol of silver citrate and 2 mols of citric acid, stirring at room temperature, filtration of the precipitated silver bromide, and concentration in vacuum. The cation has the structural formula

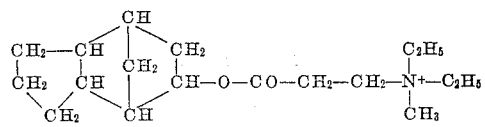

EXAMPLE 9

*Hexahydro-4,7-methanoindan-6-ol δ-dimethylaminovalerate*

To a stirred and chilled solution of 304 parts of hexahydro-4,7-methanoindan-6-ol and 200 parts of pyridine in 1500 parts of ether, an ether solution of 310 parts of δ-chlorovaleryl chloride is added in small portions. The mixture is then treated with cold dilute hydrochloric acid and the ether layer is separated, washed with water and dried over anhydrous calcium sulfate.

135 parts of the hexahydro-4,7-methanoindan-6-ol δ-chloropropionate and 38 parts of dimethylamine in 250 parts of benzene are heated in a shielded pressure vessel at 80° C. for 15 hours. The partially solid reaction mixture is extracted with dilute hydrochloric acid and the acidic layer is rendered alkaline by addition of sodium hydroxide and extracted with ether. The ether extract is dried over anhydrous potassium carbonate, filtered and evaporated, leaving as a residue the hexahydro - 4,7 - methanoindan - 6 - ol δ - dimethylaminovalerate which boils at about 137–141° C. and about 1 mm. pressure, and has the structural formula

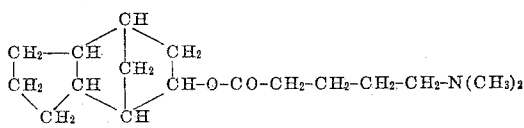

EXAMPLE 10

*Hexahydro - 4,7 - methanoindan - 6 - ol β - (N-morpholino) propionate*

450 parts of hexahydro-4,7-methanoindan-6-ol β-chloropropionate and 400 parts of morpholine in 2500 parts of benzene are heated at reflux temperature for 12 hours. There occurs formation of a solid precipitate. After addition of dilute hydrochloric acid the aqueous layer is separated, rendered alkaline by addition of ammonium hydroxide and extracted with ether. The ether extract is dried over anhydrous potassium carbonate, filtered, and evaporated, leaving the hexahydro-4,7-methanoindan - 6 - ol β - (N-morpholino) propionate as a residue boiling at about 174–176° C. and 2 mm. pressure. Treatment of an ether solution of this base with one equivalent of a 25% solution of hydrogen chloride in isopropanol yields a white crystalline hydrochloride melting at about 198–199° C. It has the structural formula

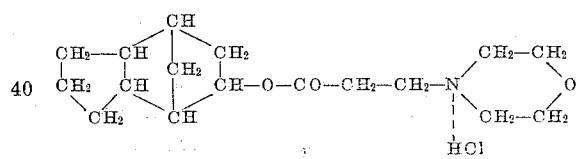

I claim:
1. A member of the group of esters consisting of the bases of the structural formula

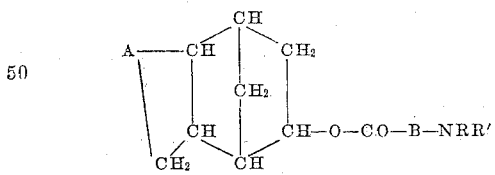

and salts thereof, wherein A is a member of the class consisting of ethylene and vinylene, B is a lower, bivalent, saturated, aliphatic hydrocarbon radical, and the radical NRR' is a member of the class consisting of lower dialkylamino radicals, morpholino radicals, and radicals wherein R and R' are combined to form a lower, saturated, bivalent, aliphatic hydrocarbon radical containing 4 to 7 carbon atoms with at least 4 and no more than 5 carbon atoms in nuclear position.

2. The compounds of the structural formula

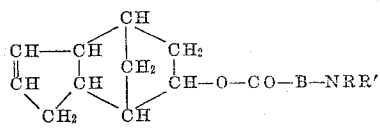

wherein B is a lower, bivalent, saturated, aliphatic hydrocarbon radical, and R and R' are lower alkyl radicals.

3. The compounds of the structural formula

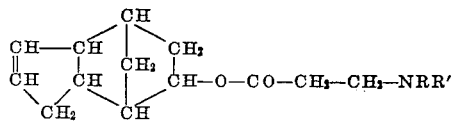

wherein R and R' are lower alkyl radicals.

4. The compounds of the structural formula

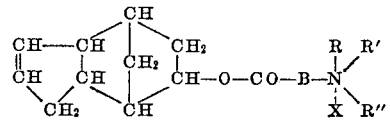

wherein B is a lower, bivalent, saturated, aliphatic hydrocarbon radical, R, R' and R" are lower alkyl radicals, and X is one equivalent of an anion.

5. The compounds of the structural formula

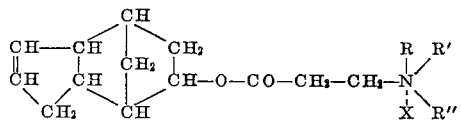

wherein R, R', and R" are lower alkyl radicals and X is one equivalent of an anion.

6. The compounds of the structural formula

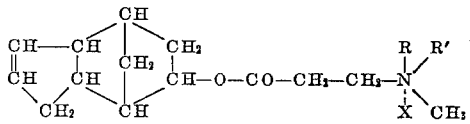

wherein R and R' are lower alkyl radicals, and X is one equivalent of an anion.

7. The compounds of the structural formula

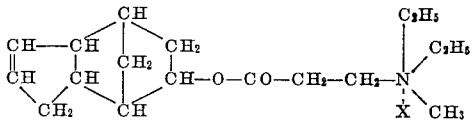

wherein X is one equivalent of an anion.

8. The compounds of the structural formula

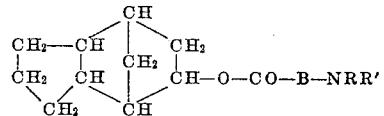

wherein B is a lower, bivalent, saturated, aliphatic hydrocarbon radical, and R and R' are lower alkyl radicals.

9. The compounds of the structural formula

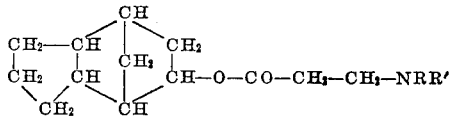

wherein R and R' are lower alkyl radicals.

10. The compounds of the structural formula

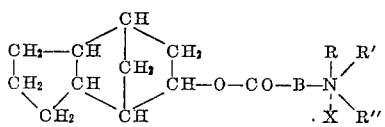

wherein B is a lower, bivalent, saturated, aliphatic hydrocarbon radical, R, R' and R" are lower alkyl radicals, and X is one equivalent of an anion.

11. The compounds of the structural formula

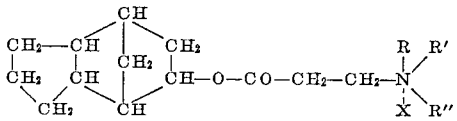

wherein R, R', and R" are lower alkyl radicals and X is one equivalent of an anion.

12. The compounds of the structural formula

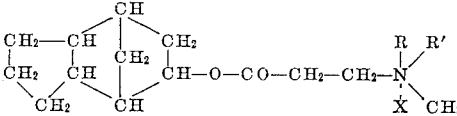

wherein R and R' are lower alkyl radicals, and X is one equivalent of an anion.

13. The compounds of the structural formula

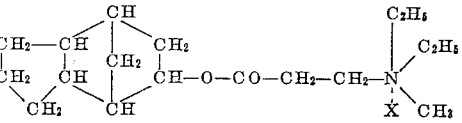

wherein X is one equivalent of an anion.

14. The salts of the compound of the structural formula

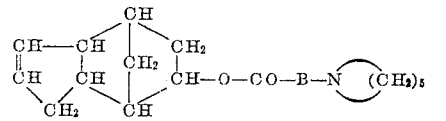

wherein B is a lower, bivalent, saturated, aliphatic hydrocarbon radical.

15. A salt of the compound of the structural formula

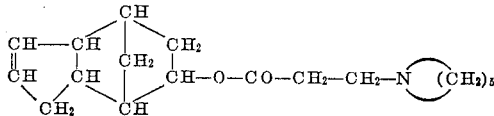

No references cited.